United States Patent [19]
Mader

[11] Patent Number: 5,896,015
[45] Date of Patent: Apr. 20, 1999

[54] METHOD AND CIRCUIT FOR FORMING PULSES CENTERED ABOUT ZERO CROSSINGS OF A SINUSOID

[75] Inventor: Urs H. Mader, Sunnyvale, Calif.

[73] Assignee: Micro Linear Corporation, San Jose, Calif.

[21] Appl. No.: 08/688,561

[22] Filed: Jul. 30, 1996

[51] Int. Cl.[6] .................................................. H05B 37/00
[52] U.S. Cl. ................... 315/291; 315/227 R; 327/170; 327/172
[58] Field of Search ................................ 327/170, 172, 327/184, 102, 165, 175; 315/307, 308, 224, 291, 246, 227 R, 363

[56] References Cited

U.S. PATENT DOCUMENTS

| | | | |
|---|---|---|---|
| 2,483,815 | 10/1949 | Easton | 175/356 |
| 2,967,267 | 1/1961 | Steinman et al. | 317/101 |
| 3,292,579 | 12/1966 | Buchanan | 119/5 |
| 3,549,990 | 12/1970 | Hochheiser | 323/44 |
| 3,611,021 | 10/1971 | Wallace | 315/239 |
| 3,671,782 | 6/1972 | Wittlinger et al. | 307/238 |
| 3,723,891 | 3/1973 | Whiteley | 327/102 |
| 3,758,823 | 9/1973 | Jett et al. | 315/219 |
| 3,772,625 | 11/1973 | Raupach | 336/94 |
| 3,778,677 | 12/1973 | Kriege | 315/219 |
| 3,810,026 | 5/1974 | Roth | 327/175 |
| 3,828,203 | 8/1974 | Belson et al. | 307/228 |
| 3,840,795 | 10/1974 | Roszyk et al. | 320/2 |

(List continued on next page.)

FOREIGN PATENT DOCUMENTS

| | | |
|---|---|---|
| 0 059 064 | 9/1982 | European Pat. Off. . |
| 0 178 852 | 4/1986 | European Pat. Off. . |
| 32 33 655 A1 | 5/1983 | Germany . |
| 34 32 266 A1 | 3/1985 | Germany . |
| 9201334 | 1/1992 | WIPO . |

OTHER PUBLICATIONS

J. Williams, "Techniques for 92% Efficient LCD Illumination" *Linear Technology Application Note 55*, pp. 1–43, Aug. 1993.

Micro Linear, "ML4874 LCD Backlight Lamp Driver," pp. 1–6, Apr. 1994.

Micro Linear, "ML4876 LCD Backlight Lamp Driver with Contrast," pp. 1–6, Apr. 1994.

(List continued on next page.)

*Primary Examiner*—Hoanganh Le
*Assistant Examiner*—David H. Vu
*Attorney, Agent, or Firm*—Haverstock & Owens LLP

[57] ABSTRACT

A circuit that forms a square wave pulse train signal wherein each pulse is centered about a zero crossing of a reference sinusoid. A first capacitor is coupled to be charged and discharged at equal rates by a first transconductance amplifier. Upon a first positive zero crossing of the reference sinusoid, the first transconductance amplifier begins charging the first capacitor. Upon the first negative zero crossing, the first transconductance amplifier begins discharging the first capacitor until a first predetermined voltage level is reached. Upon reaching the first predetermined voltage level, the first transconductance amplifier begins charging the first capacitor again. The voltage on the first capacitor is compared by a first comparator to a second predetermined voltage level higher than the first voltage level. The output of the first comparator is a pulse which is centered about a second positive zero voltage crossing of the reference sinusoid. The voltage on the first capacitor is discharged until a third positive zero crossing of the reference sinusoid when the cycle begins again. A second capacitor is coupled to be charged and discharged by a second transconductance amplifier. Upon the second positive zero crossing of the reference sinusoid, the second transconductance amplifier begins charging the second capacitor. A second pulse is formed centered about the third positive zero crossing in the same manner as the first pulse. The pulses are combined into a single signal forming a train of pulses wherein a pulse is centered about each positive zero crossing of the reference sinusoid.

18 Claims, 7 Drawing Sheets

U.S. PATENT DOCUMENTS

| | | | |
|---|---|---|---|
| 3,893,036 | 7/1975 | Cavoretto et al. | 328/185 |
| 3,921,005 | 11/1975 | Watrous | 307/64 |
| 3,953,768 | 4/1976 | Meredith et al. | 317/31 |
| 4,030,058 | 6/1977 | Riffe et al. | 336/92 |
| 4,031,449 | 6/1977 | Trombly | 320/2 |
| 4,038,625 | 7/1977 | Tompkins et al. | 336/83 |
| 4,063,108 | 12/1977 | Klett et al. | 307/64 |
| 4,127,795 | 11/1978 | Knoll | 315/210 |
| 4,144,462 | 3/1979 | Sieron et al. | 307/66 |
| 4,145,592 | 3/1979 | Mizukawa et al. | 219/625 R |
| 4,146,857 | 3/1979 | Schleupen | 336/61 |
| 4,163,923 | 8/1979 | Herbers et al. | 315/291 |
| 4,172,981 | 10/1979 | Smith | 307/66 |
| 4,207,498 | 6/1980 | Spira et al. | 315/97 |
| 4,210,846 | 7/1980 | Capewell et al. | 315/121 |
| 4,225,825 | 9/1980 | Watts | 328/185 |
| 4,251,752 | 2/1981 | Stolz | 315/206 |
| 4,260,943 | 4/1981 | Zaderej et al. | 320/21 |
| 4,277,726 | 7/1981 | Burke | 315/98 |
| 4,277,728 | 7/1981 | Stevens | 315/307 |
| 4,297,614 | 10/1981 | Chandler | 315/86 |
| 4,303,902 | 12/1981 | Lesster et al. | 336/83 |
| 4,318,608 | 3/1982 | Payne | 355/3 CH |
| 4,390,844 | 6/1983 | Ting | 328/142 |
| 4,412,265 | 10/1983 | Buuck | 361/18 |
| 4,414,493 | 11/1983 | Henrich | 315/308 |
| 4,441,053 | 4/1984 | Daspit | 315/206 |
| 4,441,054 | 4/1984 | Bay | 315/219 |
| 4,453,109 | 6/1984 | Stupp et al. | 315/219 |
| 4,486,689 | 12/1984 | Davis et al. | 315/92 |
| 4,495,446 | 1/1985 | Brown et al. | 315/206 |
| 4,496,896 | 1/1985 | Melocik et al. | 320/2 |
| 4,498,031 | 2/1985 | Stupp et al. | 315/307 |
| 4,523,131 | 6/1985 | Zansky | 315/307 |
| 4,528,482 | 7/1985 | Merlo | 315/291 |
| 4,543,556 | 9/1985 | Taylor et al. | 336/210 |
| 4,572,988 | 2/1986 | Handler et al. | 315/209 R |
| 4,585,974 | 4/1986 | Stupp et al. | 315/307 |
| 4,604,552 | 8/1986 | Alley et al. | 315/176 |
| 4,612,479 | 9/1986 | Zansky | 315/194 |
| 4,654,573 | 3/1987 | Rough et al. | 320/2 |
| 4,686,427 | 8/1987 | Burke | 315/219 |
| 4,698,554 | 10/1987 | Stupp et al. | 315/307 |
| 4,700,113 | 10/1987 | Stupp et al. | 315/224 |
| 4,704,563 | 11/1987 | Hussey | 315/307 |
| 4,717,863 | 1/1988 | Zeiler | 315/307 |
| 4,723,098 | 2/1988 | Grubbs | 315/306 |
| 4,739,227 | 4/1988 | Anderson | 315/260 |
| 4,763,239 | 8/1988 | Ball | 363/98 |
| 4,800,328 | 1/1989 | Bolger et al. | 320/2 |
| 4,806,880 | 2/1989 | Laws | 331/8 |
| 4,874,989 | 10/1989 | Nilssen | 315/151 |
| 4,893,059 | 1/1990 | Nilssen | 315/127 |
| 4,896,077 | 1/1990 | Dodd et al. | 315/289 |
| 4,920,299 | 4/1990 | Presz et al. | 315/98 |
| 4,935,669 | 6/1990 | Nilssen | 315/105 |
| 4,942,352 | 7/1990 | Sano | 320/2 |
| 4,952,849 | 8/1990 | Fellows et al. | 315/307 |
| 4,962,344 | 10/1990 | Bohrer | 307/260 |
| 5,015,919 | 5/1991 | Vila-Masot et al. | 315/86 |
| 5,045,732 | 9/1991 | Sugiura et al. | 307/529 |
| 5,048,033 | 9/1991 | Donahue et al | 372/38 |
| 5,049,790 | 9/1991 | Herfurth et al. | 315/291 |
| 5,111,118 | 5/1992 | Fellows et al. | 315/307 |
| 5,177,408 | 1/1993 | Marques | 315/291 |
| 5,202,608 | 4/1993 | Johnson | 315/86 |
| 5,214,352 | 5/1993 | Love | 315/86 |
| 5,216,402 | 6/1993 | Carosa | 336/66 |
| 5,237,242 | 8/1993 | Takahashi et al. | 315/123 |
| 5,264,776 | 11/1993 | Hulsey | 320/2 |
| 5,363,020 | 11/1994 | Chen et al. | 315/209 R |
| 5,367,223 | 11/1994 | Eccher | 315/97 |
| 5,367,224 | 11/1994 | Pacholok | 315/219 |
| 5,367,242 | 11/1994 | Hulman | 320/2 |
| 5,384,516 | 1/1995 | Kawabata et al. | 315/160 |
| 5,394,020 | 2/1995 | Nienaber | 327/140 |
| 5,408,162 | 4/1995 | Williams | 315/224 |
| 5,410,188 | 4/1995 | Segaram | 327/237 |
| 5,410,221 | 4/1995 | Mattas et al. | 315/307 |
| 5,615,093 | 3/1997 | Nalbant | 363/25 |
| 5,642,066 | 6/1997 | Burke | 327/132 |

OTHER PUBLICATIONS

U. Mader, et al., Micro Linear, "Application Note 26—Power Conversion Efficiencies for Miniature Fluorescent Lamp," pp. 1–6, Feb. 1994.

K. Kit Sum, et al., Micro Linear, "Application Note 32—Theory and Application of the ML4874 and ML4876 LCD Backlight Controller ICs," pp. 1–12, Jun. 1994.

J. J. LoCascio and U. H. Mader, "A New Control Technique Uses 25% Less Power To Drive Miniature Cold Cathode Fluorescent Lamps," *Electronic Ballast*, pp. 60–69, Apr. 1994.

M. Jordan and J.A. O'Connor, "Resonant Fluorescent Lamp Converter Provides Efficient and Compact Solution," *IEEE*, pp. 424–431, 1993.

Maxim Integrated Products, "CCFT Backlight and LCD Contrast Controllers—MAX753/MAX754," pp. 1–12, Feb. 1994.

K. Kit Sum, Micro Linear, "ML4874 Evaluation Kit User's Guide—LCD Backlight Lamp Driver," pp. 1–5, Apr. 1994.

Micro Linear, "ML4864 Evaluation User's Guide—LCD Backlight Lamp Driver with Contrast Control," pp. 1–4, Jan. 1994.

Micro Linear, "ML4864 LCD Backlight Lamp Driver with Contrast Control," pp. 1–6, Nov. 1993.

Micro Linear, "Advance Information ML–4830 Electronic Ballast Controller", Jun. 1992.

Micro Linear, "Advance Information ML–4830 Electronic Ballast Controller", Jul. 1991.

METHOD AND CIRCUIT FOR FORMING PULSES CENTERED ABOUT ZERO CROSSINGS OF A SINUSOID

FIELD OF THE INVENTION

The invention relates to the field of circuits for forming pulses centered about zero crossings of a reference sinusoid. In particular, the invention relates to circuits for forming pulses centered about zero crossings of a reference sinusoid utilizing interleaved ramp synchronization for driving resonant fluorescent lamp circuits at the resonant frequency.

BACKGROUND OF THE INVENTION

Fluorescent lamps have "negative resistance." This means that the operating voltage decreases as power dissipation in the lamp increases. Therefore, ensuring the stability of circuits for driving fluorescent lamps can be difficult. Prior art circuits for driving fluorescent lamps have utilized a phase locked loop for driving a resonant fluorescent lamp circuit at the resonant frequency. FIG. 1 shows such a prior art circuit. Referring to FIG. 1, a voltage source V1 is coupled to a source of a PMOSFET M1. A drain of the PMOSFET M1 is coupled to a drain of an NMOSFET M2 and to a first terminal of a capacitor C1. A source of the NMOSFET M2 is coupled to the ground node. A second terminal of the capacitor C1 is coupled to a first terminal of an inductor L1. A second terminal of the inductor L1 is coupled to a first terminal of a capacitor C2, to a first terminal of a fluorescent lamp LAMP1 and to a first terminal of a resistor R1. A second terminal of the capacitor C2 is coupled to the ground node. A second terminal of the fluorescent lamp LAMP1 is coupled to the ground node. A second terminal of the resistor R1 is coupled to a first terminal of a resistor R2 and to a first input to a phase comparator 100. A second terminal of the resistor R2 is coupled to the ground node.

An output of the phase comparator 100 is coupled to a first terminal of a resistor R3. A second terminal of the resistor R3 is coupled to a first terminal of a capacitor C3 and to an input to an amplifier A1. A second terminal of the capacitor C3 is coupled to the ground node. An output of the amplifier A1 is coupled to an input to a voltage controlled oscillator VCO1. An output of the voltage controlled oscillator VCO1 is coupled to a second input to the phase comparator 100 and to a non-inverting input to a comparator COMP1. An inverting input to the comparator COMP1 is coupled to a voltage source V2. An output of the comparator COMP1 is coupled to a gate of the PMOSFET M1 and to a gate of the NMOSFET M2.

A resonant circuit for driving the fluorescent lamp LAMP1 comprises the capacitor C2 and the inductor L1. The capacitor C1 blocks dc signals from the push-pull transistor pair comprising M1 and M2. A signal representative of the lamp voltage is obtained at a node between the resistors R1 and R2. This signal is approximately a sinusoid and is fed to the phase comparator 100. The output of the phase comparator 100 is filtered by a low pass filter comprising R3 and C3 and amplified as necessary by the amplifier A1. The output of the amplifier A1 is coupled to the input of the voltage controlled oscillator VCO1. The output of the voltage controlled oscillator VCO1 is fed to the phase comparator 100. A phase locked loop comprises the phase comparator 100, the low pass filter R3 and C3, the amplifier A1 and the voltage controlled oscillator. The phase locked loop causes the phase of the output signal of the voltage controlled oscillator VCO1 to match the phase of the signal at the node between R1 and R2. The frequency of each of the signals input to the phase comparator 100 will equal the resonant frequency of the resonant circuit. The output of the voltage controlled oscillator VCO1 is also fed to a comparator COMP1 for forming a square wave signal at the output of the comparator. The width of the square wave pulses is controllable by the voltage V2. The square wave signal drives the push-pull transistor pair at the resonant frequency. The voltage V1 controls the magnitude of the pulses which drive the resonant circuit.

FIG. 2 shows a timing diagram for the circuit shown in FIG. 1. The square wave signal 200 at the output of the comparator COMP1 is shown in comparison to the sinusoidal lamp signal 201 at the node between R1 and R2. It can be seen from FIG. 2 that the pulses of the signal 200 are centered with respect to time about the zero crossings of the sinusoidal signal 201.

Conventional phase locked loops, such as the one utilized in FIG. 1, take a finite amount of time to lock onto a signal due to the presence of the low pass filter in the feedback loop. Also, phase locking in a conventional phase locked loop is highly non-linear process characterized by chaotic behavior that is generally undesirable due its unpredictable nature.

Therefore, what is needed is a circuit for forming pulses which are centered about a zero crossing of an approximately sinusoidal signal that does not suffer from the disadvantages associated with phase locked loops.

SUMMARY OF THE INVENTION

The invention is a circuit that forms a square wave pulse train signal wherein each pulse is centered about a zero crossing of a reference sinusoid. A first capacitor is coupled to be charged and discharged by a first transconductance amplifier wherein the charge and discharge rates are equal such that the capacitor voltage is symmetrical with respect to time about the transition point from charging to discharging and about the transition point from discharging to charging.

Upon a first positive zero crossing of the reference sinusoid, the first transconductance amplifier begins charging the first capacitor from zero volts. Upon the first negative zero crossing, the first transconductance amplifier begins discharging the first capacitor until the first capacitor reaches a first predetermined voltage level. Upon reaching the first predetermined voltage level, the first transconductance amplifier begins charging the first capacitor again. The voltage on the first capacitor is compared by a first comparator to a second predetermined voltage level higher than the first voltage level. The output of the first comparator is a pulse which is centered about a second positive zero voltage crossing of the reference sinusoid. The voltage on the first capacitor is discharged until a third positive zero crossing of the reference sinusoid when the cycle begins again.

A second capacitor is coupled to be charged and discharged by a second transconductance amplifier wherein the charge and discharge rates are equal such that the capacitor voltage is symmetrical with respect to time about the transition point from charging to discharging and about the transition point from discharging to charging. Upon the second positive zero crossing of the reference sinusoid, the second transconductance amplifier begins charging the second capacitor from zero volts. Upon the second negative zero crossing, the second transconductance amplifier begins discharging the second capacitor until the second capacitor reaches the first predetermined voltage level. Upon reaching the first predetermined voltage level, the second transconductance amplifier begins charging the second capacitor again. The voltage on the second capacitor is compared by a second comparator to the second predetermined voltage level. The output of the second comparator is a pulse which is centered about a third positive zero voltage crossing of the reference sinusoid. The voltage on the second capacitor is discharged until a fourth positive zero crossing of the reference sinusoid when the cycle begins again.

The pulses which are alternately formed at the outputs of the first and second comparators are combined into a single signal by logic circuits forming a train of pulses wherein a pulse is centered about each zero crossing of the reference sinusoid. The width of the pulses is controlled by the predetermined voltage level. If the reference sinusoid changes in frequency, the frequency of the centered pulses will correspondingly change. Neither a phase comparator, nor a phase locked loop, is required to implement the invention.

DETAILED DESCRIPTION OF THE PREFERRED EMBODIMENT

Figure 1:
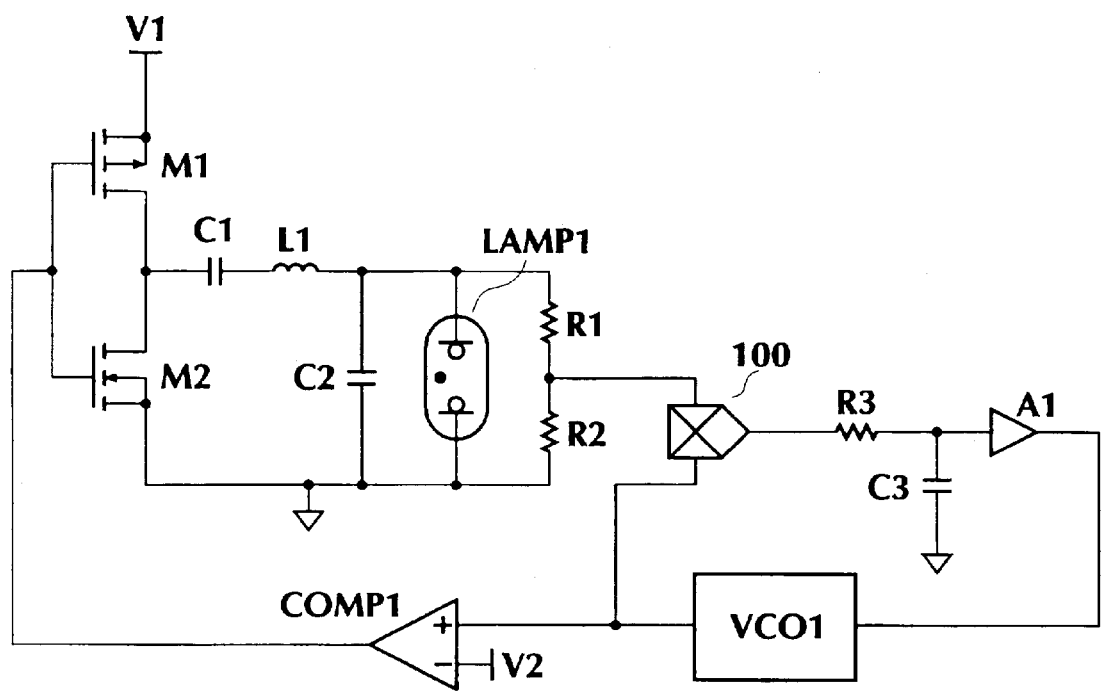
FIG. 1 shows a schematic diagram of a prior art circuit for driving a resonant circuit at its resonant frequency.
Figure 2:
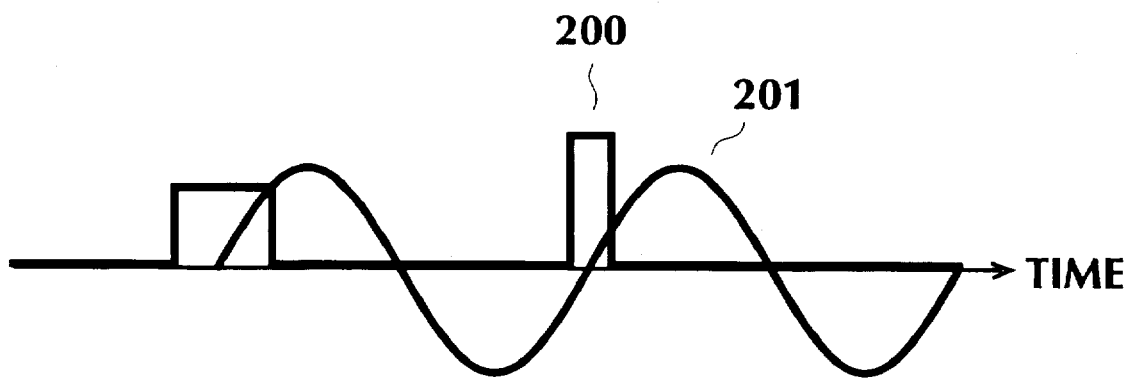
FIG. 2 shows a schematic diagram of a square wave pulse train signal having pulses centered about zero crossings of a sinusoidal reference signal.
Figure 3A:
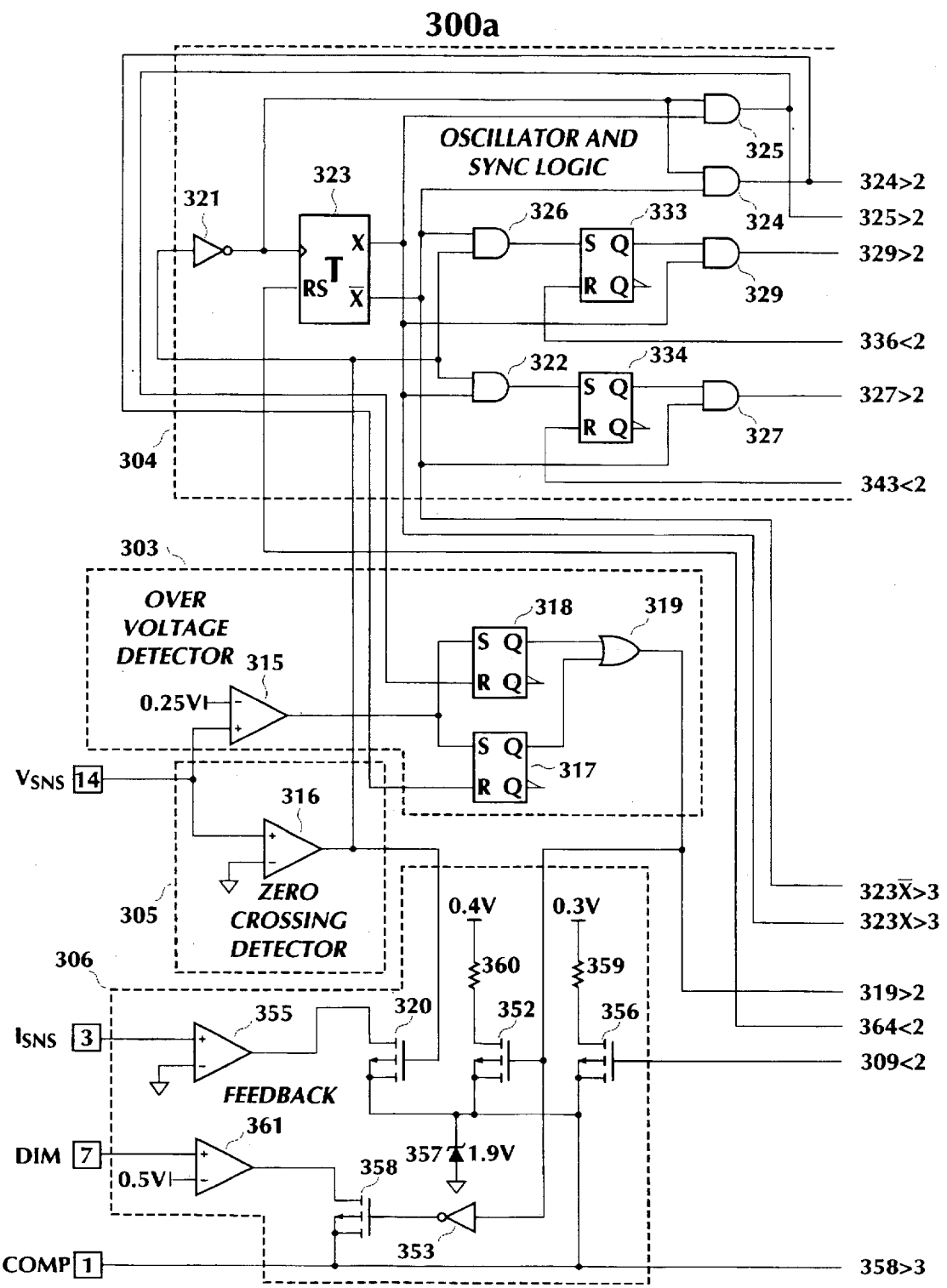
FIGS. 3a–c shows a schematic diagram of a controller circuit of the present invention.
Figure 3B:
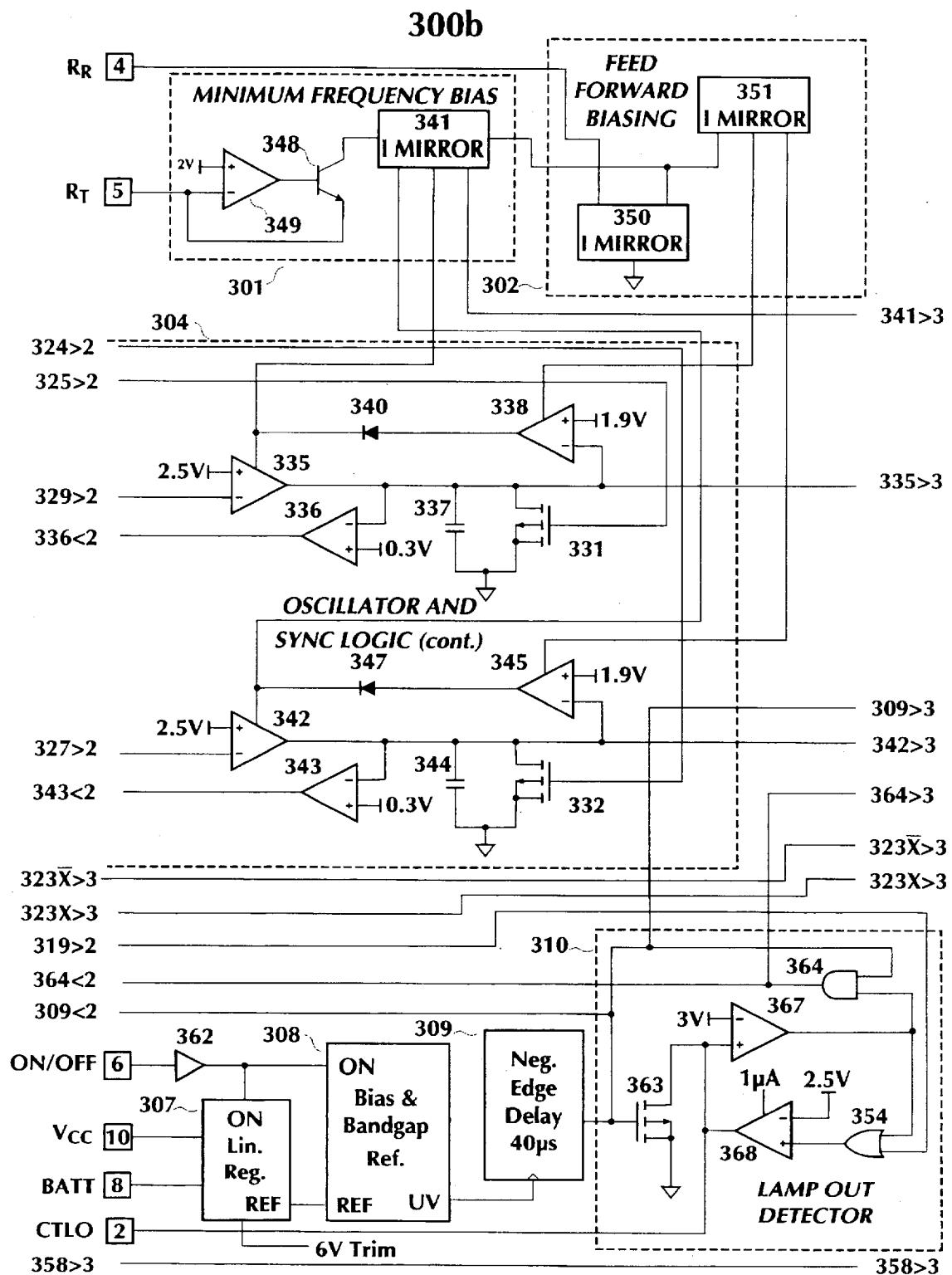
Figure 3C:
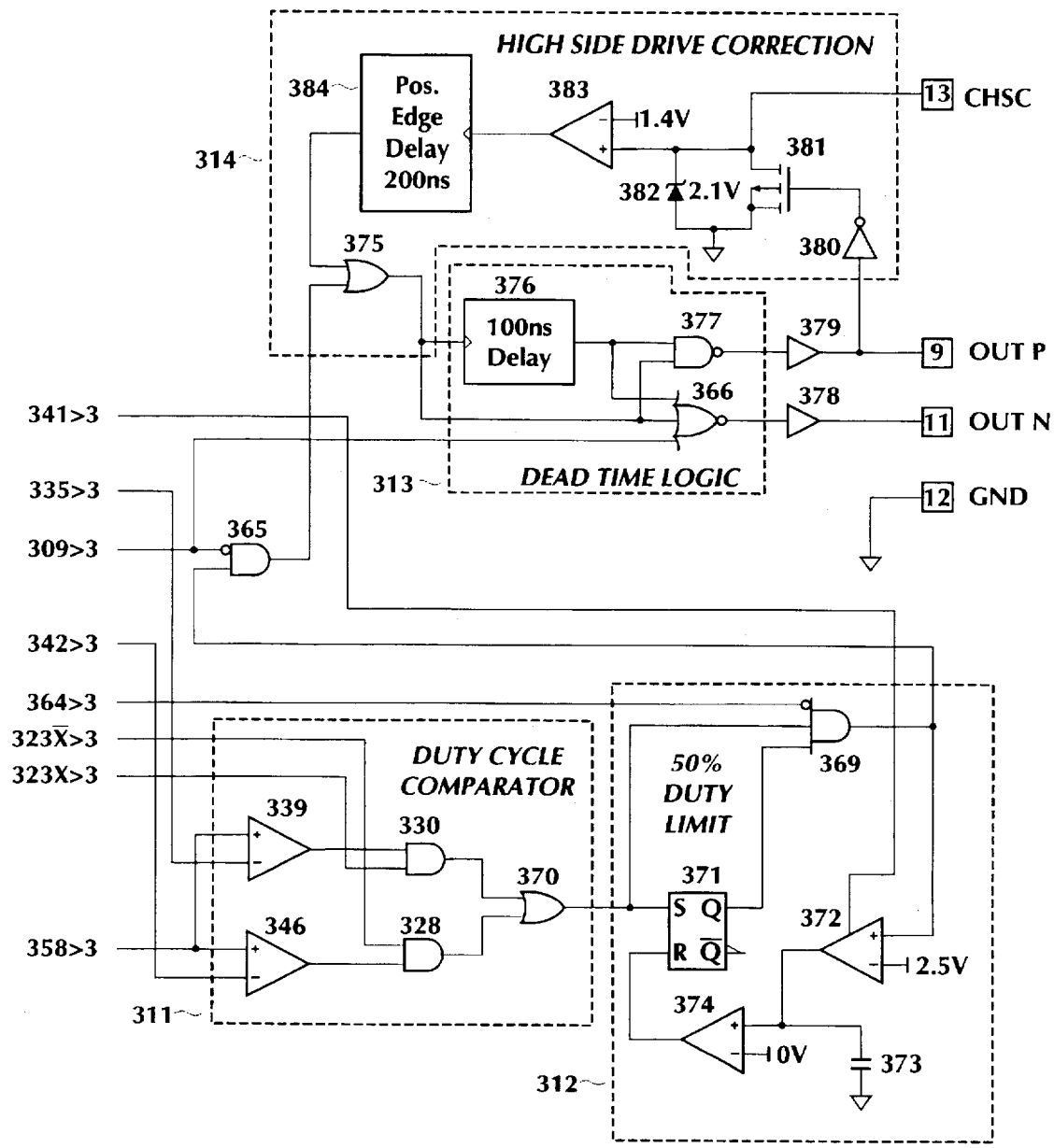

Referring to FIGS. 3a–c, a controller 300a–c of the present invention is shown. The present invention comprises a portion of the controller 300a–c, however, the entire controller 300a–c is shown for illustrative purposes. The controller 300a–c preferably comprises an integrated circuit chip, but could be constructed from discrete components. Further, the controller 300a–c is preferably an integrated circuit chip controller available from Micro Linear Corporation, located at 2092 Concourse Drive, in San Jose, Calif., zip code 95131, under part number ML4878.

The controller 300a–c comprises a minimum frequency bias circuit 301, a feed forward biasing circuit 302, an over voltage detector circuit 303, an oscillator and sync logic circuit 304, a zero crossing detector circuit 305, a feedback circuit 306, a linear regulator circuit 307, a bias & bandgap reference circuit 308, a negative edge delay circuit 309, a lamp out detector circuit 310, a duty cycle comparator circuit 311, a 50% duty cycle limit circuit 312, a dead time logic circuit 313 and a high side drive correction circuit 314. The controller also comprises a COMP pin 1, a CTLO pin 2, an ISNS pin 3, an RR pin 4, an RT pin 5, an ON/OFF pin 6, a DIM pin 7, a BATT pin 8, an OUTP pin 9, a VCC pin 10, an OUTN pin 11, a GND pin 12, a CHSC pin 13, and a VSNS pin 14.

The VSNS pin 14 is coupled to a non-inverting input to a comparator 315 and to a non-inverting input to a comparator 316. An inverting input to the comparator 315 is coupled to a voltage source of 0.25 volts. An inverting input to the comparator 316 is coupled to the ground node. An output of the comparator 315 is coupled to an S input to an R-S flip-flop 317 and to an S input to an R-S flip-flop 318. A Q output of the flip-flop 317 is coupled to a first input to an OR gate 319. A Q output of the flip-flop 318 is coupled to a second input to the OR gate 319.

An output of the comparator 316 is coupled to a gate of an NMOSFET 320, to an input to an inverter 321, and to a first input to an AND gate 322. An output of the inverter 321 is coupled to a clock input to a T flip-flop 323, to a first input to an AND gate 324, and to a first input to a AND gate 325. An X-not output of the T flip-flop 323 is coupled to a second input to the AND gate 324, to a first input to an AND gate 326, to a first input to an AND gate 327, and to a first input to an AND gate 328. The output of the comparator 316 is also coupled to a second input to the AND gate 326. An X output of the T flip flop 323 is coupled to a second input to the AND gate 325, to a first input to an AND gate 329, to a second input to the AND gate 322, and to a first input to an AND gate 330.

An output of the AND gate 325 is coupled to an R input to the R-S flip-flop 318 and to a gate of an NMOSFET 331. An output of the AND gate 324 is coupled to an R input to the R-S flip-flop 317 and to a gate of an NMOSFET 332. An output of the AND gate 326 is coupled to an S input to an R-S flip-flop 333. A Q output of the R-S flip-flop 333 is coupled to a second input to the AND gate 329. An output of the AND gate 322 is coupled to an S input to a R-S flip-flop 334. A Q output of the R-S flip-flop 334 is coupled to a second input to the AND gate 327.

An output of the AND gate 329 is coupled to an inverting input to a transconductance amplifier 335. A non-inverting input to the transconductance amplifier 335 is coupled to a voltage source of 2.5 volts. An output of the transconductance amplifier 335 is coupled to an inverting input to a comparator 336, to a first terminal of a capacitor 337, to a drain of the NMOSFET 331, to an inverting input to a transconductance amplifier 338, and to an inverting input to a comparator 339. A second terminal of the capacitor 337 is coupled to a source of the NMOSFET 331 and to the ground node. A non-inverting input to the comparator 336 is coupled to a voltage source of 0.3 volts. An output of the comparator 336 is coupled to an R input to the R-S flip-flop 333. A non-inverting input to the transconductance amplifier 338 is coupled to a voltage source of 1.9 volts. An output of the transconductance amplifier 338 is coupled to an anode of a diode 340. A cathode of the diode 340 and a first terminal of a current mirror 341 are coupled to the transconductance amplifier 335 to control the gain of the transconductance amplifier 335.

An output of the AND gate 327 is coupled to an inverting input to a transconductance amplifier 342. A non-inverting input to the transconductance amplifier 342 is coupled to a voltage source of 2.5 volts. An output of the transconductance amplifier 342 is coupled to an inverting input to a comparator 343, to a first terminal of a capacitor 344, to a drain of the NMOSFET 332, to an inverting input to a transconductance amplifier 345, and to an inverting input to a comparator 346. A second terminal of the capacitor 344 is coupled to a source of the NMOSFET 332 and to the ground node. A non-inverting input to the comparator 343 is coupled to a voltage source of 0.3 volts. An output of the comparator 343 is coupled to an R input to the R-S flip-flop 334. A non-inverting input to the transconductance amplifier 345 is coupled to a voltage source of 1.9 volts. An output of the transconductance amplifier 345 is coupled to an anode of a diode 347. A cathode of the diode 347 and a second terminal of a current mirror 341 are coupled to the transconductance amplifier 342 to control the gain of the transconductance amplifier 342.

A third terminal of the current mirror 341 is coupled to a collector of an npn bipolar transistor 348. An emitter of the bipolar transistor 348 is coupled to an inverting input to an amplifier 349 and to the RT pin 5. A non-inverting input to the amplifier 349 is coupled to a voltage source of 2 volts. An output of the amplifier 349 is coupled to a base of the bipolar transistor 348. A fourth terminal of the current mirror 341 is coupled to a first terminal of a current mirror 350 and to a first terminal of a current mirror 351. A second terminal of the current mirror 350 is coupled to the RR pin 4. A third terminal of the current mirror 350 is coupled to the ground node. A second terminal of the current mirror 351 is coupled to control the gain of the transconductance amplifier 338. A third terminal of the current mirror 351 is coupled to control the gain of the transconductance amplifier 345.

An output of the OR gate 319 is coupled to a gate of an NMOSFET 352, to an input to an inverter 353, and to a first input to an OR gate 354. The ISNS pin 3 is coupled to a non-inverting input to a transconductance amplifier 355. An inverting input to the transconductance amplifier 355 is coupled to the ground node. An output of the transconductance amplifier 355 is coupled to a drain of the NMOSFET 320. A source of the NMOSFET 320 is coupled to a source of the NMOSFET 352, to a source of an NMOSFET 356, to a cathode of a 1.9 volt Zener diode 357, to a source of an NMOSFET 358, to a non-inverting input to the comparator 339, to a non-inverting input to the comparator 346, and to the COMP pin 1. An anode of the diode 357 is coupled to the ground node. A drain of the NMOSFET 356 is coupled to a first terminal of a 5K ohm resistor 359. A second terminal of the resistor 359 is coupled to a voltage source of 0.3 volts. A drain of the NMOSFET 352 is coupled to a first terminal of a 100K ohm resistor 360. A second terminal of the resistor 360 is coupled to a voltage source of 0.4 volts.

An output of the inverter 353 is coupled to a gate of the NMOSFET 358. The DIM pin 7 is coupled to a non-inverting input to a transconductance amplifier 361. An inverting input to the transconductance amplifier 361 is coupled to a voltage source of 0.5 volts. An output of the transconductance amplifier 361 is coupled to a drain of the NMOSFET 358. The ON/OFF pin 6 is coupled to an input to a buffer 362. An output of the buffer 362 is coupled to an ON input to the linear regulator 307, and to an ON input to the bias & bandgap reference circuit 308. The BATT pin 8 is coupled to supply power to the linear regulator 307. The VCC pin 10 is coupled to the linear regulator 307. A REF terminal of the linear regulator is coupled to a REF terminal of the bias & bandgap reference circuit 308. An output UV of the bias & and bandgap reference circuit 308 is coupled to an input to the 40 us negative edge delay circuit 309.

An output of the negative edge delay circuit 309 is coupled to a gate of the NMOSFET 356, to a gate of an NMOSFET 363, to a first input to an AND gate 364, to a first inverted input to an AND gate 365, and to a first input to an OR gate 366. A drain of the NMOSFET 363 is coupled a non-inverting input to a comparator 367, to an output of a transconductance amplifier 368, and to the CTLO pin 2. A source of the NMOSFET 363 is coupled to the GND node. An inverting input to the comparator 367 is coupled to a voltage source of 3 volts. An output of the comparator 367 is coupled to a second input to the AND gate 364 and to a second input to the OR gate 354. An output of the OR gate 354 is coupled to a non-inverting input to the transconductance amplifier 368. An inverting input to the transconductance amplifier 368 is coupled to a voltage source of 2.5 volts. The transconductance amplifier is biased with a current of 1 µA.

An output of the AND gate 364 is coupled to an RS input to the flip-flop 323 and to a first inverting input to an AND gate 369. An output of the comparator 339 is coupled to a second input to the AND gate 330. An output of the comparator 346 is coupled to a second input to the AND gate 328. An output of the AND gate 330 is coupled to a first input to an OR gate 370. An output of the AND gate 328 is coupled a second input to the OR gate 370. An output of the OR gate 370 is coupled to an S input to an R-S flip-flop 371 and to a second input to the AND gate 369. A Q output of the flip-flop 371 is coupled to a third input to the AND gate 369. An output of the AND gate 369 is coupled to a second input to the AND gate 365 and to a non-inverting input to a transconductance amplifier 372. An inverting input to the transconductance amplifier 372 is coupled to a voltage source of 2.5 volts. A fifth terminal of the current mirror 341 is coupled to control the gain of the transconductance amplifier 372.

An output of the transconductance amplifier 372 is coupled to a first terminal of a capacitor 373 and to a non-inverting input to a comparator 374. A second terminal of the capacitor 373 is coupled to the ground node. An inverting input to the comparator 374 is coupled to the ground node. An output of the comparator 374 is coupled to an R input to the flip-flop 371. An output of the AND gate 365 is coupled to a first input to an OR gate 375. An output of the OR gate 375 is coupled to an input to a 100 ns delay circuit 376, to a first input to a NAND gate 377, and to a second input to the NOR gate 366. An output of the delay circuit 376 is coupled to a second input to the NAND gate 377 and to a third input to the NOR gate 366.

An output of the NOR gate 366 is coupled to an input to a buffer 378. An output of the buffer 378 is coupled to the OUTN pin 11. An output of the NAND gate 377 is coupled to an input to a buffer 379. An output of the buffer 379 is coupled to the OUTP pin 9 and to an input to an inverter 380. An output of the inverter 380 is coupled to a gate of an NMOSFET 381. A source of the NMOSFET 381 is coupled to the ground node. A drain of the NMOSFET 382 is coupled to the CHSC pin 13, to a cathode of a 2.1 volt Zener diode 382, and to a non-inverting input to a comparator 383. An inverting input to the comparator 383 is coupled a voltage source of 1.4 volts. An output of the comparator 383 is coupled to an input to a 200 ns positive edge delay circuit 384. An output of the positive edge delay circuit 384 is coupled to a second input to the OR gate 375. An anode of the diode 382 is coupled to the ground node. The GND pin 12 is coupled to the ground node.

Figure 4:
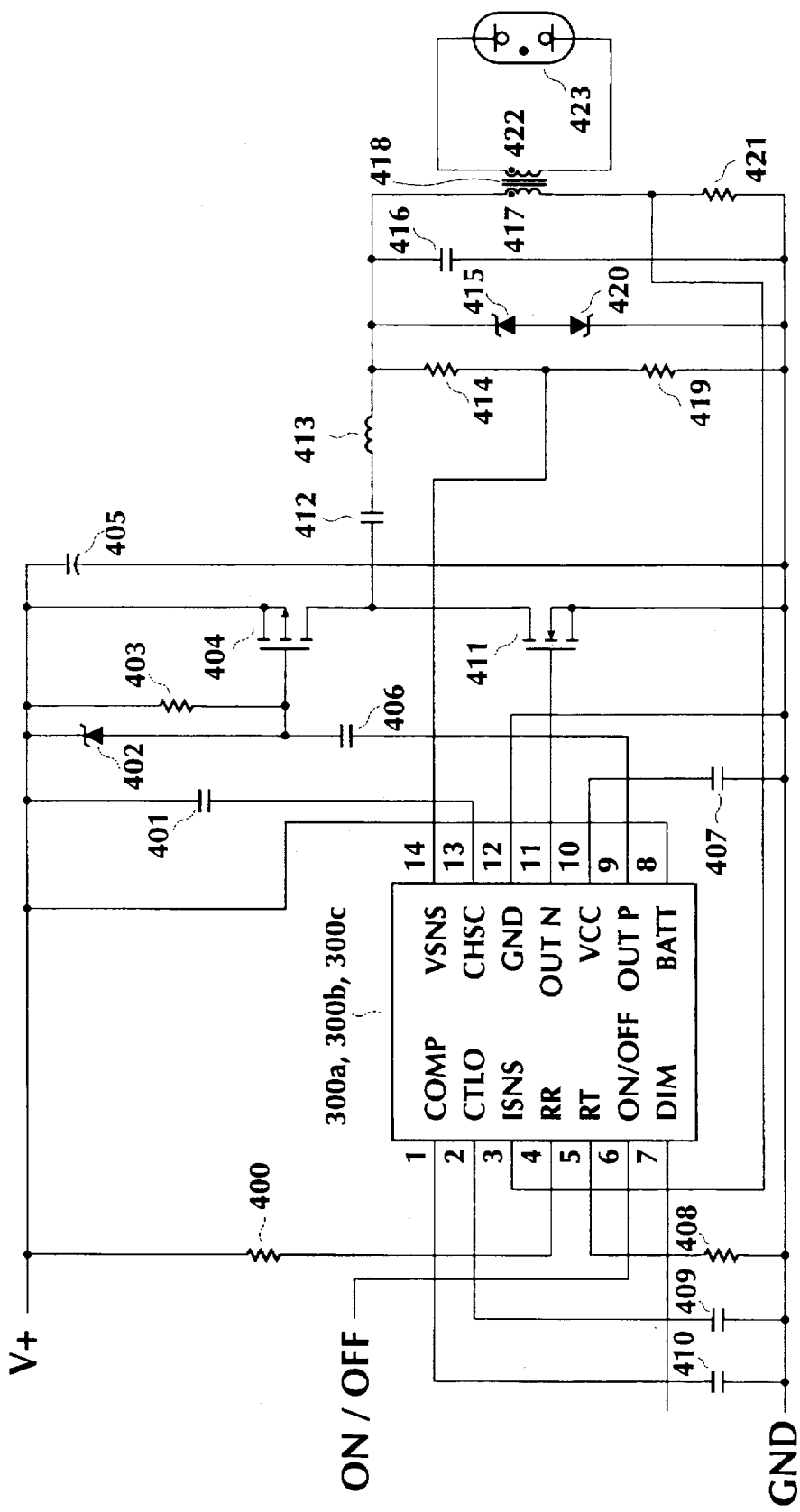
FIG. 4 shows a schematic diagram of circuits external to the controller circuit of the present invention.
Figure 5:
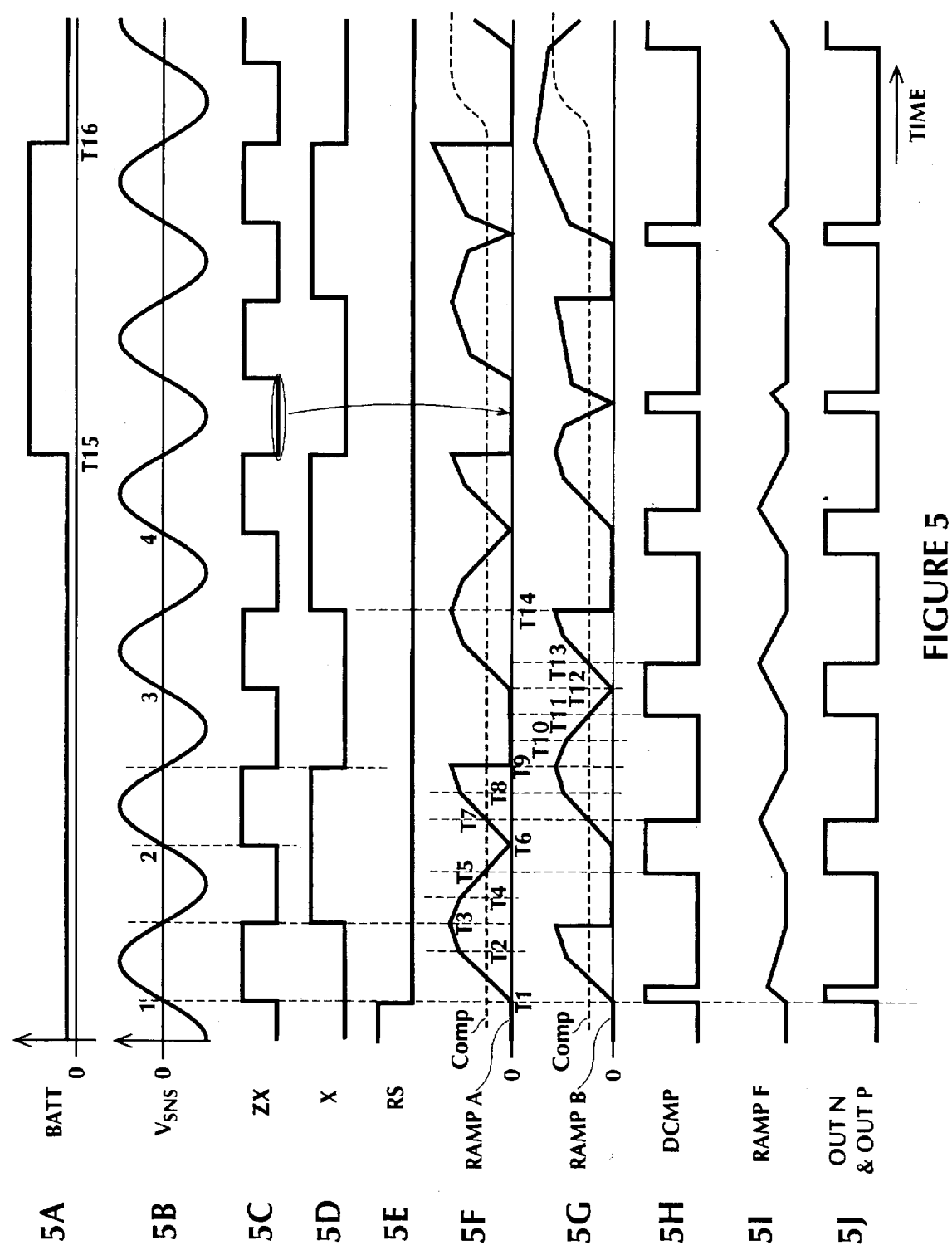
FIGS. 5A–5J show a timing diagram for signals of the circuits shown in FIGS. 3 and 4.

FIG. 4 shows a schematic diagram of circuits external to the controller chip 300 of FIGS. 3a–c. Referring to FIG. 4, a voltage supply V+, such as a battery, is coupled to the BATT pin 8 of the controller 300a–c, to a first terminal of a resistor 400, to a first terminal of a capacitor 401, to a cathode of a Zener diode 402, to a first terminal of a resistor 403, to a source of a PMOSFET 404 and to a first terminal of a capacitor 405. A second terminal of the resistor 400 is coupled to the RR pin 4 of the controller 300a–c. A second terminal of the capacitor 401 is coupled to the CHSC pin 13 of the controller 300a–c. An anode of the Zener diode 402 is coupled to a second terminal of the resistor 403, to a gate of the PMOSFET 404, and to a first terminal of a capacitor 406. A second terminal of the capacitor 406 is coupled to the OUTP pin 9 of the controller 300a–c. A second terminal of the capacitor 405 is coupled to the ground node.

The DIM pin 7 of the controller 300a–c is coupled to be controlled by an external circuit for dimming the lamp. The VCC pin 10 of the controller 300a–c is coupled to a first terminal of a capacitor 407. A second terminal of the capacitor 407 is coupled to the ground node. The RT pin 5 of the controller 300a–c is coupled to a first terminal of a resistor 408. A second terminal of the resistor 408 is coupled to the ground node. The CTLO pin 2 of the controller 300a–c is coupled to a first terminal of a capacitor 409. A second terminal of the capacitor 409 is coupled to the ground node. The COMP pin 1 of the controller 300a–c is coupled to a first terminal of a capacitor 410. A second terminal of the capacitor 410 is coupled to the ground node.

The GND pin 12 of the controller 300a–c is coupled to the ground node. The ON/OFF pin 6 of the controller 300a–c is coupled to be controlled by an external circuit for turning the lamp on or off. The OUTN pin 11 of the controller 300a–c is coupled to a gate of an NMOSFET 411. A drain of the NMOSFET 411 is coupled to a drain of the PMOSFET 404 and to a first terminal of a capacitor 412. A source of the NMOSFET 411 is coupled to the ground node. A second terminal of the capacitor 412 is coupled to a first terminal of an inductor 413. A second terminal of the inductor 413 is coupled to a first terminal of a resistor 414, to a cathode of a Zener diode 415, to a first terminal of a capacitor 416, and to a first terminal of a primary winding 417 of a transformer 418. According to the "dot convention" for determining transformer winding polarities, the first terminal of the primary winding 417 is designated with a dot.

A second terminal of the resistor 414 is coupled to the VSNS pin 14 of the controller 300 and to a first terminal of a resistor 419. A second terminal of the resistor 419 is coupled to the ground node. An anode of the Zener diode 415 is coupled to an anode of a Zener diode 420. A cathode of the Zener diode 420 is coupled to the ground node. A second terminal of the capacitor 416 is coupled to the ground node. A second terminal of the primary winding 417 is coupled to a first terminal of a resistor 421 and to the ISNS pin 3 of the controller 300a–c. A second terminal of the resistor 421 is coupled to the ground node.

A first terminal of a secondary winding 422 of the transformer 418 is coupled to a first terminal of a cold cathode fluorescent lamp 423. According to the "dot convention," the first terminal of the secondary winding 422 is designated with a dot. A second terminal of the secondary winding 422 is coupled to a second terminal of the fluorescent lamp 423.

FIGS. 5A–5J shows a timing diagram during the operation of the present invention for signals at several nodes of the circuit shown in FIGS. 3 and 4. Referring to FIGS. 5A–5J, BATT is the input signal to the BATT pin 8 of the controller 300a–c as shown in FIG. 4. VSNS is representative of the signal applied to the fluorescent lamp 423 shown in FIG. 4 and is the signal applied to the VSNS pin 14 of the controller 300a–c shown in FIGS. 3a–c and 4. Recall that an object of the invention is to drive a lamp with a resonant circuit at its resonant frequency by inputting pulses to the resonant circuit wherein the pulses are centered about a zero crossing of the lamp signal VSNS. ZX is the signal at the output of the comparator 316 of FIG. 3a. The comparator 316 serves as a zero crossing detector for the signal VSNS applied to the lamp 423. The signal ZX is at a logical high voltage level when the signal VSNS is above zero volts and at a logical low voltage level when the signal VSNS is below zero volts. The X signal of FIGS. 5A–5J is obtained by the logic circuits coupled to the output of the comparator 316. The RAMPA signal of FIGS. 5A–5J is the voltage across the capacitor 337 of FIG. 3b. The RAMPB signal of FIGS. 5A–5J is the voltage across the capacitor 344 of FIG. 3b.

The DCMP signal is representative of the centered pulse signal used to drive the resonant lamp circuit. The DCMP signal is formed by logic of the duty cycle compare circuit 311 and the oscillator and sync logic circuit 304 which combine the outputs of the comparator 339 and the comparator 346 such that the pulses in the DCMP signal are alternately formed by the RAMPA comparison and the RAMPB comparison, as described above. This is effected by the X and X-not outputs of the flip-flop 323 which are coupled to the AND gates 330 and 328.

Referring to FIGS. 5A–5J, the RAMPA signal, having been discharged by the transistor 331, begins at zero volts prior to a first positive zero crossing 1 of the VSNS signal. When the first positive zero crossing 1 of the VSNS signal is reached, at approximately the time T1, as detected by the comparator 316, the logic circuits of the oscillator and sync logic circuit 304 of FIGS. 3a–c cause the transconductance amplifier 335 to begin charging the capacitor 337 at a rate determined by the biasing signal to the transconductance amplifier 335. At the next negative zero crossing of the VSNS signal, at the time T3, the logic circuits of the oscillator and sync logic circuit 304 cause the capacitor 337 to begin discharging at the same rate that it was charged. When the voltage on the capacitor 337 reaches approximately zero (actually 0.3 volts as determined by the voltage at the non-inverting input to the comparator 336), at the time T6, the logic circuits of the oscillator and sync logic circuit 304 stop discharging the capacitor 337 and begin charging the capacitor 337.

The RAMPA signal, which represents the voltage stored on the capacitor 337, is compared by the comparator 339 of FIG. 3c to a voltage on the COMP pin 1 of the controller as shown in FIG. 3a. The COMP pin 1 voltage level is an error signal formed by the brightness level set on the DIM pin 7 and the feedback signal from the ISNS pin 3. This brightness signal is shown as a horizontal dotted line superimposed on the RAMPA signal of FIGS. 5A–5J. The output of the comparator 339 is shown by the pulse in the DCMP signal of FIGS. 5A–5J beginning at time T5 and ending at the time T7. This pulse is centered about the zero crossing of the signal VSNS at approximately the time T6 and is used to drive the lamp resonant circuit. At the time T9, the oscillator and sync logic circuit 304 rapidly discharges the capacitor 337 through the transistor 331. The RAMPA signal then remains low until the third positive zero crossing 3 of the signal VSNS at approximately the time T12 and the cycle described above repeats.

The RAMPB signal is the voltage on the capacitor 344. Referring back to approximately the time T3, the capacitor 344 is rapidly discharged by the oscillator and sync logic circuits 304 through the transistor 332. At the second positive zero crossing 2 of the signal VSNS, which occurs at approximately the time T6, the capacitor 344 begins to be charged by the transconductance amplifier 342 at a rate determined by the biasing signal to the transconductance amplifier 342. At the time T9, when the signal VSNS reaches a negative zero crossing, the capacitor 344 is discharged by the oscillator and sync logic circuit 304 at the same rate that it was charged. At the time T12, when the voltage on the capacitor 344 reaches approximately zero (actually 0.3 volts as determined by the voltage at the non-inverting input to the comparator 343), the oscillator and sync logic circuit 304 stops discharging the capacitor 344 and begins charging the capacitor 344.

The RAMPB signal, which represents the voltage stored on the capacitor 344, is compared by the comparator 346 of FIG. 3c to a voltage on the COMP pin 1 of the controller 300a–c as shown in FIG. 3a. The COMP pin 1 voltage level is an error signal formed by the brightness level set on the DIM pin 7 and the feedback signal from the ISNS pin 3. This brightness signal is shown as a horizontal dotted line superimposed on the RAMPB signal of FIGS. 5A–5J. The output of the comparator 346 is shown by the pulse in the DCMP signal of FIGS. 5A–5J beginning at time T11 and ending at the time T13. This pulse is centered about the zero crossing of the signal VSNS at approximately the time T12 and is used to drive the lamp resonant circuit. At the time T14, the oscillator and sync logic circuit 304 rapidly discharges the capacitor 344 through the transistor 331. The RAMPB signal then remains low until the fourth positive zero crossing 4 of the signal VSNS and the cycle described above repeats.

Thus, a circuit for centering pulses about a zero crossing without using a phase comparator or phase locked loop has been described. Rather, the signals RAMPA and RAMPB are synchronously interleaved to obtain the object of the invention. Two ramp signals RAMPA and RAMPB are needed, rather than a single ramp signal, because it is not assured that the zero crossings will coincide precisely with the capacitors 337 and 344 being discharged to approximately zero volts (0.3 volts). For this reason, the capacitors 337 and 344 are rapidly discharged at the times T9 and T14, respectively. However, it will be apparent that a single ramp signal could be used to generate all the pulses in the DCMP signal, but with reduced accuracy in centering the pulses about zero crossings of the VSNS signal.

The invention synchronizes the pulses of the DCMP signal to the sinusoidal signal VSNS within only one cycle, whereas, a phase locked loop could take longer or could fail to synchronize at all.

Referring to FIGS. 5A–5J, it can be seen that the RAMPA signal changes slope at the times T2 and T4, and the RAMPB signal changes slope at the times T8 and T10. To achieve the object of centering the pulses about a zero crossing, it is important that each of the capacitors be charged and discharged at the same rates. For example, from the time T1 to the time T6, the RAMPA signal must be symmetrical about the time T3 and from the time T6 to the time T12, the RAMPB signal must be symmetrical about the time T9. As described above, the RAMPA and RAMPB signals are compared to the voltage level shown by the dotted line superimposed on the RAMPA and RAMPB signals shown in FIGS. 5A–5J. Therefore, the level of the voltage on the capacitor 337 or 344 is not important so long as the voltage level on the capacitor 337 or 344 is higher than the voltage COMP represented by the dotted line and so long as the capacitors are charged and discharged at equal rates.

The rate at which the capacitor 337 is charged depends upon the bias current to the transconductance amplifier 335. The bias current to the transconductance amplifier 335 has two components. A first component is provided by the current mirror 341. A second component is provided by the transconductance amplifier 338 through the diode 340. The diode 340 prevents current from entering the output of the transconductance amplifier 338. Similarly, the rate at which the capacitor 344 is charged depends upon the bias current to the transconductance amplifier 342. The bias current to the transconductance amplifier 342 also has two components. A first component is provided by the current mirror 341. A second component is provided by the transconductance amplifier 345 through the diode 347. The diode 347 prevents current from entering the output of the transconductance amplifier 345.

At the time T1, upon the first positive zero crossing of the signal VSNS, the output of the AND gate 329 is a logical low voltage, the voltage on the capacitor 337 is below 1.9 volts, and the transconductance amplifier 335, biased by both the current mirror 341 and the transconductance amplifier 338, charges the capacitor 337. Once the voltage on the capacitor 337 reaches 1.9 volts, at the time T2, the transconductance amplifier 338 stops providing biasing current to the transconductance amplifier 335 so that the capacitor 337 is charged at a slower rate, as shown by the reduced slope of the RAMPA circuit between the times T2 and T3. Then, once the negative zero crossing of VSNS occurs, at the time T3, the capacitor 337 is discharged at the slower rate until the capacitor 337 is discharged to below 1.9 volts. Once the capacitor 337 is discharged to below 1.9 volts, at the time T4, the transconductance amplifier 338 causes the rate at which the transconductance amplifier 335 discharges the capacitor 337 to increase again to correspond to the rate that the capacitor 337 was charged between the times T1 and T2.

Similarly, once the voltage on the capacitor 344 is above 1.9 volts, the rate at which the transconductance amplifier charges and discharges the capacitor 344 is reduced because the transconductance amplifier 345 stops providing an additional biasing current to the transconductance amplifier 342. When the voltage on the capacitor 344 is below 1.9 volts, the rate at which the transconductance amplifier 342 charges the capacitor 344 is increased because the transconductance amplifier 345 provides the additional biasing current.

A benefit of this technique is that the voltage headroom required for the signals RAMPA and RAMPB is reduced and therefore lower supply voltage levels are can be used. At the same time the circuit can use a relatively high gain when the RAMPA and RAMPB signals are below the 1.9 volt threshold. This relatively high gain increases the accuracy of the pulse widths and the ability to control the slope of the RAMPA and RAMPB signals and also increases the ability to control the pulse widths of the DCMP signal.

If voltage on the external resistor 400, illustrated in FIG. 4, increases, then current into the RR pin 4 of the controller 300a–c increases, as shown in FIGS. 5A–5J by the transition in the signal BATT at the time T15 to the time T16, and the capacitors 337 and 344 will be charged even more rapidly than described above. This results in a steeper slope in the RAMPA and RAMPB signals. Thus, the pulses in the DCMP signal are narrower to reflect the reduced duty cycle required to maintain a given lamp brightness. This is achieved by the current mirrors 350 and 351 increasing the biasing current to the transconductance amplifiers 338 and 345. Thus, when the RAMPA and RAMPB signals are below 1.9 volts, the slope is increased in comparison to the slope which results when BATT is at the lower level. When the RAMPA and RAMPB signals are above 1.9 volts, the slope is the same as when BATT is at the lower level because the bias current provided by the current mirror 341 is not increased when BATT is at the higher level. Thus, another means for controlling the slope of the RAMPA and RAMPB signals is disclosed. It will be apparent that any number of different slopes which are selected based on any criteria could be employed, or a constant slope could be employed.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. It will be apparent that transistors of one type, such as NMOS, PMOS, bipolar pnp or bipolar npn can be interchanged with a transistor of another type, and in some cases interchanged with diodes, with appropriate modifications, and so forth. In addition, the transconductance amplifiers of the present invention could be implemented by any type of current source. Also, a switch may be implemented with a transistor of any type. Further, the logic circuits of the oscillator and sync logic circuit 304 could be implemented in many different ways while remaining within the spirit and scope of the invention.

What is claimed is:

1. A method of forming a pulse centered about a zero crossing of a sinusoidal signal comprising the steps of:
   a. initializing a voltage level on a first capacitor;
   b. charging the first capacitor for a time period which begins at a first zero crossing of the sinusoidal signal and ends at a second zero crossing of the sinusoidal signal; and
   c. comparing the voltage on the first capacitor to a first reference level for forming a pulse centered about a third zero crossing of the sinusoidal signal while simultaneously:
      (1) discharging the first capacitor for a time period which begins at the second zero crossing of the sinusoidal signal and ends when the voltage on the first capacitor reaches a second reference level; and
      (2) charging the first capacitor for a time period which begins when the voltage on the first capacitor reaches the second reference level and ends after the sinusoidal signal reaches the first reference level.

2. The method according to claim 1 wherein the first reference level is higher than the second reference level.

3. The method according to claim 1 further comprising the step of repeating the steps a., b. and c. for forming a sequence of pulses centered about zero crossings of the sinusoidal signal.

4. The method according to claim 3 further comprising the step of providing power to a resonant circuit at the resonant frequency by utilizing the sequence of pulses to control a power source coupled to the resonant circuit.

5. The method according to claim 4 wherein the first reference level controls a width of the pulses in the sequence of pulses thereby controlling a brightness level of a fluorescent lamp coupled to the resonant circuit.

6. The method according to claim 1 wherein the voltage on the first capacitor is symmetrical about the time when the voltage on the first capacitor reaches the second reference level over the time period which begins when the voltage on the first capacitor goes below the first reference level and ends when the voltage on the first capacitor goes above the first reference level.

7. The method according to claim 6 further comprising the steps of:
   d. varying a rate of charging the first capacitor when the voltage on the first capacitor crosses a third reference level; and
   e. varying a rate of discharging the first capacitor when the voltage on the first capacitor crosses the third reference level.

8. The method according to claim 1 further comprising the steps of:
   d. initializing a voltage level on a second capacitor;
   e. charging the second capacitor for a time period which begins at the third zero crossing of the sinusoidal signal and ends at the fourth zero crossing of the sinusoidal signal; and
   f. comparing the voltage on the second capacitor to a fourth reference level for forming a pulse centered about a fifth zero crossing of the sinusoidal signal while simultaneously:
      (1) discharging the second capacitor for a time period which begins at the fourth zero crossing of the sinusoidal signal and ends when the voltage on the second capacitor reaches a fifth reference level; and
      (2) charging the second capacitor for a time period which begins when the voltage on the second capacitor reaches the fifth reference level and ends after the sinusoidal signal reaches the fourth reference level.

9. The method according to claim 8 further comprising the step of repeating the steps a., b., c., d., e. and f. for forming a sequence of pulses centered about zero crossings of the sinusoidal signal.

10. The method according to claim 8 wherein the voltage on the first capacitor is symmetrical about the time when the voltage on the first capacitor reaches the second reference level over the time period which begins when the voltage on the first capacitor goes below the first reference level and ends when the voltage on the first capacitor goes above the first reference level and wherein the voltage on the second capacitor is symmetrical about the time when the voltage on the second capacitor reaches the fifth reference level over the time period which begins when the voltage on the second capacitor goes below the fourth reference level and ends when the voltage on the second capacitor goes above the fourth reference level.

11. The method according to claim 9 further comprising the step of providing power to a resonant circuit at its resonant frequency by utilizing the sequence of pulses to control a power source coupled to the resonant circuit.

12. The method according to claim 11 wherein the first reference level and the fourth reference level control a width of the pulses in the sequence of pulses thereby controlling a brightness level of a fluorescent lamp coupled to the resonant circuit.

13. A circuit for forming pulses centered about a zero crossing of a sinusoidal signal comprising:
   a. means for charging and for discharging a first capacitor coupled to the first capacitor;
   b. means for detecting zero crossings of the sinusoidal signal coupled to the means for charging and for discharging the first capacitor wherein the first capacitor is gradually charged after the sinusoidal signal crosses the zero axis a first time, then gradually discharged after the sinusoidal signal crosses the zero axis a second time and then gradually charged again approximately after the sinusoidal signal crosses the zero axis a third time; and
   c. means for comparing a voltage level on the first capacitor to a first reference voltage level, the means for comparing coupled to the first capacitor wherein a product of the comparison is a first pulse centered about a time when the sinusoidal signal crosses the zero axis the third time.

14. The circuit according to claim 13 further comprising:
   a. means for charging and for discharging a second capacitor coupled to the second capacitor;

b. means for detecting zero crossings of the sinusoidal signal coupled to the means for charging and for discharging the second capacitor wherein the second capacitor is gradually charged after the sinusoidal signal crosses the zero axis the third time, then gradually discharged after the sinusoidal signal crosses the zero axis a forth time and then gradually charged again approximately after the sinusoidal signal crosses the zero axis a fifth time; and c. means for comparing a voltage level on the second capacitor to a second reference voltage level, the means for comparing coupled to the second capacitor wherein a product of the comparison is a second pulse centered about a time when the sinusoidal signal crosses the zero axis the fifth time.

15. The circuit according to claim 14 further comprising a combining circuit coupled to receive the first pulse and the second pulse for forming a sequence of pulses.

16. The circuit according to claim 15 further comprising:

a. a resonant circuit having a resonant frequency wherein the resonant circuit is coupled to provide power to a load; and b. a circuit for delivering power to the resonant circuit coupled to be controlled by the sequence of pulses whereby the resonant circuit is driven at the resonant frequency.

17. The circuit according to claim 16 wherein the load is a fluorescent lamp.

18. The circuit according to claim 17 wherein the first reference voltage level and the second reference voltage level control a width of the pulses in the sequence of pulses thereby controlling a brightness level of the fluorescent lamp.

* * * * *